United States Patent
Cravey

(10) Patent No.: US 7,691,960 B2
(45) Date of Patent: Apr. 6, 2010

(54) CITRIC ACID BASED EMULSIFIERS FOR OILFIELD APPLICATIONS EXHIBITING LOW FLUORESCENCE

(75) Inventor: Rodney Lee Cravey, Manvel, TX (US)

(73) Assignee: Akzo Nobel N.V., Arnhem (NL)

( * ) Notice: Subject to any disclaimer, the term of this patent is extended or adjusted under 35 U.S.C. 154(b) by 226 days.

(21) Appl. No.: 10/556,021

(22) PCT Filed: May 19, 2004

(86) PCT No.: PCT/EP2004/005561

§ 371 (c)(1),
(2), (4) Date: Nov. 8, 2005

(87) PCT Pub. No.: WO2004/106456

PCT Pub. Date: Dec. 9, 2004

(65) Prior Publication Data

US 2007/0066795 A1     Mar. 22, 2007

Related U.S. Application Data

(60) Provisional application No. 60/473,504, filed on May 27, 2003.

(51) Int. Cl.
*C08G 69/08*     (2006.01)

(52) U.S. Cl. .......... 528/310; 507/129; 507/130
(58) Field of Classification Search .......... 528/310; 507/129, 130
See application file for complete search history.

(56) References Cited

U.S. PATENT DOCUMENTS

| | | | | |
|---|---|---|---|---|
| 3,654,177 A | * | 4/1972 | Foley | 516/27 |
| 4,575,428 A | * | 3/1986 | Clapper et al. | 507/131 |
| 5,869,433 A | * | 2/1999 | Patel | 507/103 |

FOREIGN PATENT DOCUMENTS

WO     WO 03/042324 A1     5/2003

OTHER PUBLICATIONS

International Search Report, No. PCT/EP2004/005561, Aug. 16, 2004.

* cited by examiner

*Primary Examiner*—James Seidleck
*Assistant Examiner*—Gregory Listvoyb
(74) *Attorney, Agent, or Firm*—Ralph J. Mancini

(57) ABSTRACT

The present invention relates to a composition of citric acid based emulsifiers comprising polyamides for oilfield drilling applications that exhibit very low fluorescence, and to a process for their preparation.

13 Claims, No Drawings

CITRIC ACID BASED EMULSIFIERS FOR OILFIELD APPLICATIONS EXHIBITING LOW FLUORESCENCE

FIELD OF THE INVENTION

The present invention generally relates to a composition of citric acid based emulsifiers for oilfield drilling applications exhibiting low fluorescence.

BACKGROUND OF THE INVENTION

The present invention generally relates to a composition of citric acid based emulsifiers for oilfield drilling applications exhibiting low fluorescence. The compositions of the present invention are particularly useful in oilfield drilling applications.

Drilling generally occurs in two phases: exploration and development. Exploration activities are those operations involving the drilling of wells to locate hydrocarbon bearing formations and to determine the size and production potential of hydrocarbon reserves. Development activities involve the drilling of production wells once a hydrocarbon reserve has been discovered and evaluated.

Drilling for oil and gas is generally performed by rotary drilling methods that use a circularly rotating drill bit that grinds through the earth's crust as it descends. Drilling fluids are pumped down through the drill bit via a pipe that is connected to the bit, and serve to cool and lubricate the bit during drilling. The rock chips that are generated as the bit drills through the earth are termed drill cuttings. The drilling fluid also serves to transport the drill cuttings back up to the surface through the space between the drill pipe and the well wall, termed the annulus). The drilling fluid also controls downhole pressure and stabilizes the well bore.

As drilling progresses, large casing pipes called are inserted into the well to line the well wall. Drilling continues until the hydrocarbon bearing formations are encountered. In areas where drilling fluids and drill cuttings are allowed to be discharged under the current regulations, well depths range from approximately 1219 to 3658 meters deep, and it takes approximately 20 to 60 days to complete drilling.

On the surface, the drilling fluid and drill cuttings undergo an extensive separation process to remove as much fluid from the cuttings as possible. The fluid is then recycled into the system, and the cuttings become a waste product. The drill cuttings retain a certain amount of the drilling fluid that is discharged or disposed with the cuttings. Drill cuttings are discharged by the shale shakers and other solids separation equipment. Drill cuttings are also cleaned out of the mud pits and from the solid separation equipment during displacement of the drilling fluid system. Intermittently during drilling, and at the end of the drilling process, drilling fluids may become wastes if they can no longer be reused or recycled.

In the relatively new area of deepwater drilling, generally greater than 914 meters water depth, new drilling methods are evolving which can significantly improve drilling efficiencies and thereby reduce the volume of drilling fluid discharges as well as reduce non-water quality effects of fuel and steel consumption and air emissions. Subsea drilling fluid boosting, referred to as subsea pumping is one such technology. Rotary drilling methods are generally performed as described with the exception that the drilling fluid is energized or boosted by use of a pump at or near the seafloor. By boosting the drilling fluid, the adverse effect on the wellbore caused by the drilling fluid pressure from the seafloor to the surface is eliminated, thereby allowing wells to be drilled with as much as a 50% reduction in the number of casing strings generally required to line the well wall. Wells are drilled in less time, including less trouble time. To enable the pumping of drilling fluids and cuttings to the surface, some drill cuttings, larger than approximately one-fourth of an inch, are separated from the drilling fluid at the seafloor since these cuttings cannot reliably be pumped to the surface. The drill cuttings that are separated at the seafloor are discharged through an eductor hose at the seafloor within a 91 meter radius of the well site. For purposes of monitoring, representative samples of drill cuttings discharged at the seafloor can be transported to the surface and separated from the drilling fluid in a manner similar to that employed at the seafloor. The drilling fluid, which is boosted at the seafloor and transports most of the drill cuttings back to the surface, is processed as described in the general rotary drilling methods described above in this section.

Once the target formations have been reached, and a determination made as to which have commercial potential, the well is made ready for production by a process termed "completion". Completion involves cleaning the well to remove drilling fluids and debris, perforating the casing that lines the producing formation, inserting production tubing to transport the hydrocarbon fluids to the surface, and installing the surface wellhead. The well is then ready for production, or actual extraction of hydrocarbons.

Drilling fluids and drill cuttings are the most significant wastestreams from exploratory and development well drilling operations. Recently proposed regulations establish discharge limitations for drilling fluids in areas where drilling fluids and drill cuttings are allowed for discharge. These discharge areas are the offshore waters beyond 4.8 kilometers from shore except the offshore waters of Alaska which has no 4.8 kilometer discharge restriction, and the coastal waters of Cook Inlet, Ak. Drilling is currently active in three regions in these discharge areas: (i) the offshore waters beyond three miles from shore in the Gulf of Mexico (GOM), (ii) offshore waters beyond three miles from shore in California, and (iii) the coastal waters of Cook Inlet, Ak. Offshore Alaska is the only other area where drilling is active and effluent guidelines allows discharge. However, drilling wastes are not currently discharged in the Alaska offshore waters. Increased activity in the deepwater increases the usefulness of synthetic based drilling fluids. Operators drilling in the deepwater cite the potential for riser disconnect in floating drill ships, which favors synthetic fluids; higher daily drilling cost which more easily justifies use of more expensive synthetic based fluids; and greater distance to barge drilling wastes that may not be discharged.

As a result of recently proposed regulations, it is desirable to provide drilling fluids having low fluorescence. Fluorescence is a relative brightness test and discharged drilling fluids having low fluorescence are less likely to impart a sheen to the ocean's surface. Accordingly, it is the primary object of the present invention to provide citric acid based emulsifiers for oilfield drilling applications exhibiting low fluorescence.

SUMMARY OF THE INVENTION

The present invention relates to a composition of citric acid based emulsifiers comprising polyamides for oilfield drilling applications that exhibit very low fluorescence, and to a process for their preparation.

DETAILED DESCRIPTION OF THE INVENTION

The present invention generally relates to a composition of citric acid based emulsifiers for oilfield drilling applications exhibiting low fluorescence. More specifically, the invention relates to polyamides made by a novel method having a much lower fluorescence value compared to polyamides made by conventional methods. Typically, the fluorescence of the polyamides of the present invention is less than 500; in another embodiment, less that 400, and in another embodiment less than 300.

In one embodiment of the invention, said polyamides are triamides of general formula I, II, or mixtures thereof.

Triamides of general formula (I) and/or (II) are generally known for use in oilfield applications

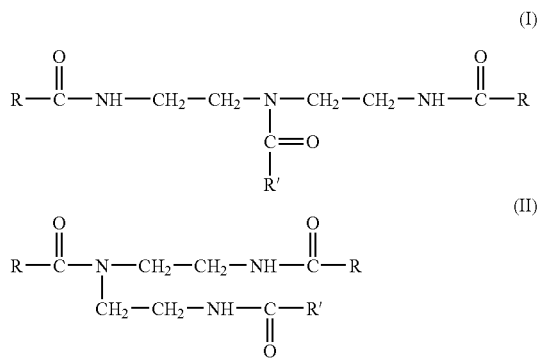

wherein R is a saturated or unsaturated, straight or branched chain fatty acid, and R' is citric acid. It is preferred that R be selected from the group consisting of: $C_{12}$-$C_{22}$ fatty acids, mono-alkyl esters of a $C_{12}$-$C_{22}$ alkyl sulphuric acids, $C_{11}$-$C_{13}$ alkyl benzene sulphonic acids, anionic derivatives thereof, salts thereof, and combinations thereof. The term "anionic derivative" is typically intended to include dissociated acids. In another embodiment R is selected from the group consisting of $C_{12}$-$C_{22}$ fatty acids, anionic derivatives thereof, salts thereof, and combinations thereof.

$C_{12}$-$C_{22}$ fatty acids can be represented by the formula:

$R_1$—COOH, wherein, $R_1$ is a $C_{11}$-$C_{21}$ alkyl group. Salts of fatty acids can be represented by the formula:

$R_1$—COO$^-$M$^+$, wherein, M+ is an alkali metal ion, preferably Na$^+$ and/or K$^+$, and $R_1$ is a $C_{11}$-$C_{21}$ alkyl group. Anionic derivatives of fatty acids can be represented by the formula $R_1$—COO$^-$, wherein, $R_1$ is a $C_{11}$-$C_{21}$ alkyl group.

Preferred sources of $C_{12}$-$C_{22}$ fatty acids are selected from the group consisting of: lauric acid, tridecylic acid, myristic acid, pentadecylic acid, palmitic acid, margaric acid, stearic acid, arachidic acid, phytanic acid, behenic acid, anionic derivatives thereof, salts thereof, and combinations thereof. Most preferably, the source of acid is stearic acid.

Preferred sources of acid are $C_{12}$-$C_{22}$ fatty acids comprising a saturated alkyl group. Other preferred sources of acids are $C_{12}$-$C_{22}$ fatty acids comprising an unsaturated group, typically having an iodine value of from 15 to 25, preferably from 18 to 22.

The source of acid may be selected from the group consisting of palmitoleic acid, oleic acid, elaidic acid, vaccenic acid, linoleic acid, cis-eleostearic acid, trans-eleostearic acid, linolenic acid, arachidonic acid, anionic derivatives thereof, salts thereof, and combinations thereof.

Preferred sources of fatty acids are selected from the group consisting of coconut, soybean, tallow, palm, palm kernel, rapeseed, lard, sunflower, corn, safflower, canola, olive, peanut, and combinations thereof. A highly preferred source of fatty acid is tallow. Preferred fatty acids have a cis:trans isomer ratio of from 1:1 to 200:1, preferably from 10:1 to 200:1. A preferred source of acid is hard tallow fatty acid and/or partially hydrogenated tallow fatty acid.

The source of acid may be a $C_{11}$-$C_{13}$ alkyl benzene sulphonic acid. The source of acid may be an anionic derivative or a salt of a $C_{11}$-$C_{13}$ alkyl benzene sulphonic acid.

The source of acid may be a mono-alkyl ester of a $C_{12}$-$C_{22}$ alkyl sulphuric acid. The acid source may be an anionic derivative or a salt of a mono-alkyl ester of a $C_{12}$-$C_{22}$ alkyl sulphuric acid. A preferred source of a mono-alkyl ester of a $C_{12}$-$C_{22}$ alkyl sulphuric acid is tallow alkyl sulphate.

Polyamides are conventionally prepared by first reacting a fatty acid with diethylenetriamine in order to form the amide followed by the reaction of the amide with citric acid. This approach leads to a polyamide that exhibits high fluorescence (600+). Offshore drilling applications for polamides require, however, that they have lower fluorescence values, i.e., fluorescence values lower than 300. Conventional methods are unsuitable for making such a product.

According to the process of the present invention, polyamides are prepared by first reacting a monofunctional acid with a polyamine in order to form the amide. Citric acid is a preferred polyfunctional acid, and a class of preferred polyamines is the polyethylenetriamines represented by the following formula:

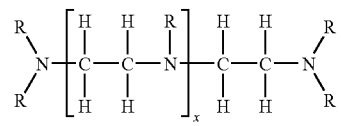

wherein each R is independently selected from H, an alkyl group, an aromatic group, and combinations thereof and x is an integer. Diethylenetriamine is a preferred polyamine. Subsequent to amide formation the amide imidazoline is then formed by heating the to temperatures effective to form said imidazoline. These temperatures typically range from 149-268° C., preferable 204-232° C. while water is removed. After the imidazoline is formed, the intermediate is cooled and citric acid is added and the reaction mixture is then reheated to form the amide. Typical reaction temperatures for this step range from 121-177° C., with 149-154° C. usually being sufficient. The citric acid opens up the imidazoline ring to form the triamide product. In this way one can produce triamides having fluorescence values well below the 300 maximum, and values as low as 50 have been obtained. The lowest fluorescence was obtained with the best conversion of the amide to imidazoline, however fluorescence values of 200 or less has been obtained in commercial quantities by simply holding at cyclization temperatures for roughly 4 hours without extending extra effort at optimizing the cyclization. By preparing the imidazoline before the citric acid addition, longer heat times and higher temperatures are not required. Additionally, the resulting intermediate is liquid and is therefore easier to cool (due to lower viscosity and less fouling in

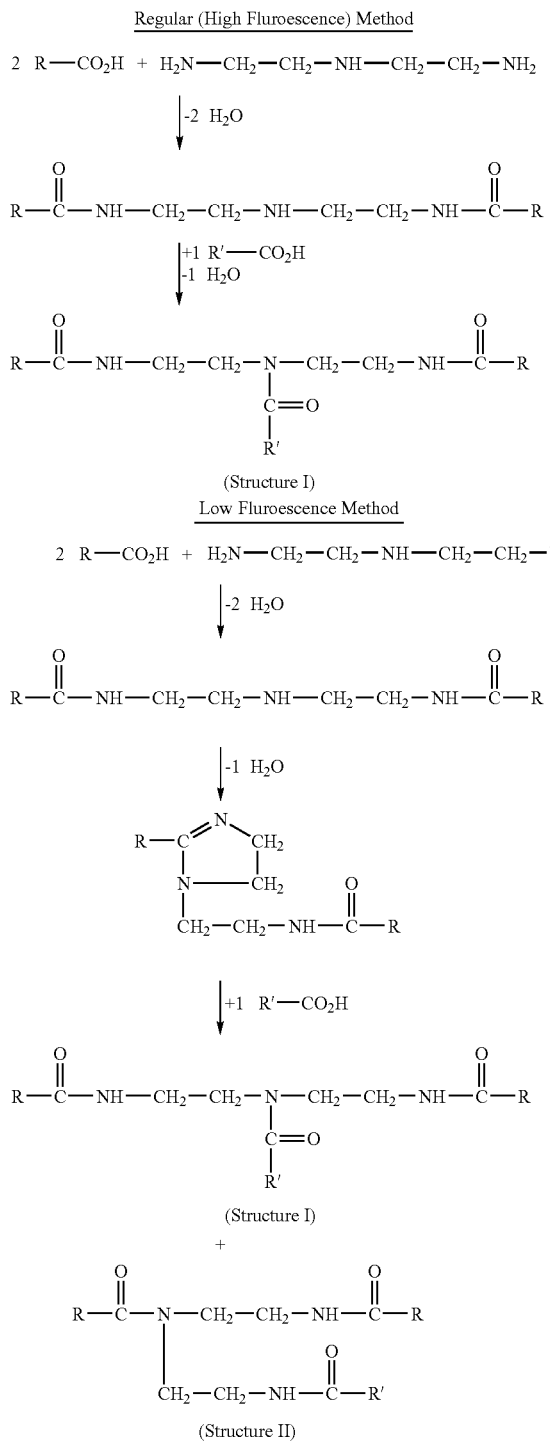

While not wishing to be bound by any particular theory, it is believed that the polyamides for oilfield drilling applications that exhibit very low fluorescence according to the invention comprise compounds of Structure I, structure II and/or mixtures thereof.

The invention will now be illustrated by the following examples.

Fluorescence Determination

This method describes the procedure employed for the determination of fluorescence as presented in this document. The sensitivity of a spectrofluorimeter is established using a 0.0093% solution of Omnimul, which is commercially available from Baker Hughes Intec. The fluorescence of a 0.0090% solution of the sample under test is then measured.

Apparatus and Reagents:
  (1) Turner Designs TD-360 Spectrofluorimeter, available from Turner Designs Hydrocarbon Instruments, Inc., Fresno, Calif.
  (2) Methacrylate Disposable Cuvettes, 1.00 cm path length, available from a number of chemical supply houses
  (3) Volumetric Flasks, 100 mL capacity
  (4) Isopropanol, IPA, HPLC Grade or equivalent
  (5) Analytical Balance, 0.001 g accuracy
  (6) Omnimul Composite, available from Baker Hughes Inteq
  (7) Pipet, 1.00 mL glass, or equivalent Procedure:

A. Preparation of Solutions
  (1) Place 0.93±0.01 g of Omnimul Composite into a 100 mL volumetric flask and dilute to the mark with isopropanol. Stir until homogenous.
  (2) Place 1.00 mL of the solution prepared in Step A1 into a 100 mL volumetric flask and dilute to the mark with isopropanol. Stir until homogenous. This is the 0.0093% Omnimul Solution.
  (3) Place 0.90±0.01 g of sample into a 100 mL volumetric flask and dilute to the mark with isopropanol. Stir until homogenous.
  (4) Place 1.00 mL of the solution prepared in Step A3 into a 100 mL volumetric flask and dilute to the mark with isopropanol. Stir until homogenous. This is the 0.0090% Sample Solution.

B. Calibration
  (1) Turn on the Turner Designs TD-360 spectrofluorimeter and allow to equilibrate for a minimum of 10 minutes.
  (2) Place a cuvette containing isopropanol into the instrument and close the lid. Wait for 15 seconds; then press the "BLANK" button
  (3) Save the result by depressing the "1" key, when requested.
  (4) Fill a cuvette with the 0.0093% Omnimul Solution, insert into the instrument, and close the cover. Wait 15 seconds, then press the "CAL" button. Enter 1000 as the calibration value for the 0.0093% Omnimul Solution and press the "ENT" button.

C. Sample Analysis
  (1) Fill a clean cuvette with a 0.0090% solution of the sample under test.
  (2) Insert the cuvette into the instrument, close the cover, press the "GO" button and wait 15 seconds for the reading to stabilize.

D. Troubleshooting

If the instrument reads "over" when attempting to calibrate using the 0.0093% Omnimul Solution as the 1000 calibration standard, perform the following steps:
(1) Select "MENU" from the keypad
(2) Select "1" Reset Index
(3) Select "2" Units; Select "4" More; Select "7" None
(4) Select "3" Diagnostics. If "Max Readable" is less than 1000, dilute the 1000 calibration standard by adding 10 mL of IPA to 1 mL of the 0.0093% Omnimul Solution. Calibrate the instrument to 1000 with this solution.
(5) Select "3" Diagnostics. "Max Readable" should now be increased approximately 10 fold
(6) Follow the calibration procedure described in "B" above, using the 0.0093% Omnimul Solution and entering 1000 as the calibration value.

Example 1

Preparation of a Low Fluorescence Triamide According to the Invention

1. To a flask set to collect distillate, Tall Oil Fatty acid (401.6 grams) is heated with agitation to 65° C.
2. Diethylene Triamine (DETA) (72.1 grams) is added and the material is allowed to exotherm and/or heated to 160° C. with a small subsurface nitrogen purge.
3. The product is held at 160° C. for 1 hour to allow the reaction to form diamide to be complete as evidenced by removal of 2 moles of water per mole of DETA.
4. The product is then heated to 221° C. where an additional mole of water is removed from the formation of imidazoline.
5. The product is then cooled and isomerized alpha olefin C1618 at 65%:35% C16:C18 (369.1 grams) is added as solvent.
6. When the product has been cooled to 82° C., Citric Acid (131.6 grams) is added to the product.
7. The material is heated back to 149° C. and held for one hour to allow both distillate and carbon dioxide off gassing to evolve from the flask.
8. After one hour at 149° C., the product is heated to 155° C. for one more hour.
9. The product is cooled to 93° C. and Dimer Trimer Acid 65-35 (25.6 grams) is added and allowed to mix in.
10. The resulting triamide will have a fluorescence ranging from 50 to 300.

Comparative Example 1

Preparation of a High Fluorescence Triamide

1. To a flask set to collect distillate, Tall Oil Fatty acid (401.6 grams) is heated with agitation to 66° C.
2. Diethylene Triamine (DETA) (72.1 grams) is added and the material is allowed to exotherm and/or heated to 160° C. with a small subsurface nitrogen purge.
3. The product is held at 160° C. for 2 hours to allow the reaction to form diamide to be complete as evidenced by removal of 2 moles of water per mole of DETA.
4. The product is then cooled and isomerized alpha olefin C1618 at 65%:35% C16:C18 (369.1 grams) is added as solvent.
5. When the product has been cooled to 82° C., Citric Acid (131.6 grams) is added to the product.
6. The material is heated back to 149° C. and held for one hour to allow both distillate and carbon dioxide off gassing to evolve from the flask.
7. After one hour at 149° C., the product is heated to 154° C. for one more hour.
8. The product is cooled to 93° C. and Dimer Trimer Acid 65-35 (25.6 grams) is added and allowed to mix in.
9. The resulting triamide will have a fluorescence ranging from 500 to 1,000.

The invention claimed is:

1. A process for the preparation of a triamide having low fluorescence which comprises reacting a monofunctional acid with a polyamine in order to form an amide; heating said amide for a time and at a temperature effective to form the imidazoline of said amide; and reacting said imidazoline of said amide with citric acid in order to form a triamide product having a fluorescence value of less than about 400.

2. The process of claim 1 wherein said monofunctional acid is a $C_{12}$-$C_{22}$ fatty acid of the formula:

$R_1$—COOH, wherein, $R_1$ is a $C_{11}$-$C_{21}$ alkyl group; a salt a $C_{12}$-$C_{22}$ fatty acid of the formula:

$R_1$—COO$^-$M$^+$, wherein, M+ is an alkali metal ion and $R_1$ is a $C_{11}$-$C_{21}$ alkyl group, an anionic derivative of a $C_{12}$-$C_{22}$ fatty acid of the formula $R_1$—COO$^-$, wherein, $R_1$ is a $C_{11}$-$C_{21}$ alkyl group, or mixtures thereof.

3. The process of claim 1 wherein said polyamines are represented by the formula:

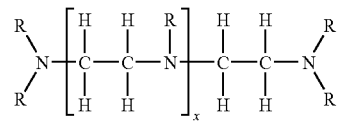

wherein each R is independently selected from H, an alkyl group, an aromatic group, and combinations thereof and x is an integer.

4. The process of claim 3 wherein said polyamine is diethylenetriamine.

5. The process of claim 1 wherein said triamide has a fluorescence value of less than about 300.

6. The process of claim 1 wherein said effective temperature for imidazoline formation is equal to or greater than 177° C.

7. The process of claim 6 wherein said effective temperature for imidazoline formation is equal to or greater than 204° C.

8. The process of claim 1 wherein said imidazoline of said amide is reacted with said citric acid at a temperature of from about 149-177° C. in order to form a polyamide product having low fluorescence.

9. An emulsifier composition which comprises at least one polyamide, wherein said polyamide comprises at least one compound of general formula (I) and (II):

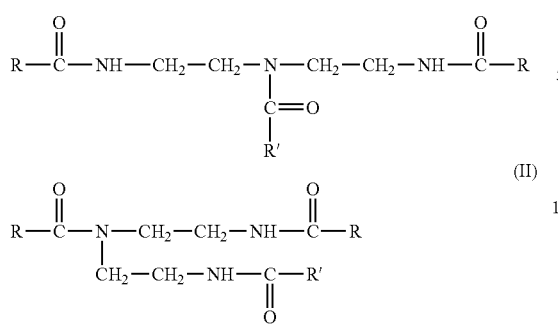

wherein R is a saturated or unsaturated, straight or branched chain fatty acid, and R' is citric acid, and wherein said composition has a fluorescence value of less than about 400.

10. The composition of claim 6 wherein said composition has a fluorescence value of less than about 300.

11. A drilling fluid composition which comprises the emulsifier composition of claim 6.

12. The composition of claim 10 wherein said composition has a fluorescence value of less than about 200.

13. The process of claim 1 wherein said triamide has a fluorescence value of less than about 200.

* * * * *